(12) United States Patent
Doyen et al.

(10) Patent No.: US 9,919,273 B2
(45) Date of Patent: Mar. 20, 2018

(54) BACKWASHABLE FILTRATION ELEMENT

(71) Applicant: VIVO NV (VLAAMSE INSTELLING VOOR TECHNOLOGISCH ONDERZOEK NV), Mol (BE)

(72) Inventors: Willy Doyen, Wommelgem (BE); Bart Molenberghs, Mol (BE)

(73) Assignee: VITO NV (VLAAMSE INSTELLING VOOR TECHNOLOGISCH ONDERZOEK NV), Mol (BE)

( * ) Notice: Subject to any disclaimer, the term of this patent is extended or adjusted under 35 U.S.C. 154(b) by 518 days.

(21) Appl. No.: 14/376,375

(22) PCT Filed: Feb. 4, 2013

(86) PCT No.: PCT/EP2013/052161
§ 371 (c)(1),
(2) Date: Aug. 1, 2014

(87) PCT Pub. No.: WO2013/113928
PCT Pub. Date: Aug. 8, 2013

(65) Prior Publication Data
US 2015/0027948 A1  Jan. 29, 2015

(30) Foreign Application Priority Data
Feb. 3, 2012 (EP) .................... 12153928

(51) Int. Cl.
*B01D 69/06* (2006.01)
*B01D 69/10* (2006.01)
(Continued)

(52) U.S. Cl.
CPC .......... *B01D 69/12* (2013.01); *B01D 63/081* (2013.01); *B01D 63/082* (2013.01); *B01D 65/02* (2013.01);
(Continued)

(58) Field of Classification Search
CPC .... B01D 63/08; B01D 63/081; B01D 63/087; B01D 65/003; B01D 67/0011;
(Continued)

(56) References Cited

U.S. PATENT DOCUMENTS

| | | | |
|---|---|---|---|
| 6,755,970 B1 * | 6/2004 | Knappe ................. | B01D 61/18 |
| | | | 210/321.69 |
| 2003/0150808 A1 | 8/2003 | Morikawa et al. | |

(Continued)

FOREIGN PATENT DOCUMENTS

| | | |
|---|---|---|
| EP | 0 602 560 | 6/1994 |
| EP | 0 662 341 | 7/1995 |

(Continued)

OTHER PUBLICATIONS

English language machine translation of JP-H08-010587, No Date, 10 pages.*

(Continued)

*Primary Examiner* — Pranav N Patel
(74) *Attorney, Agent, or Firm* — Merchant & Gould P.C.

(57) ABSTRACT

A planar filtration element includes a planar support structure (11) and at least one filtration layer (12, 13) made of a membrane material. The planar support structure has first and second opposite outer surfaces (111, 112) spaced apart and secured by spacing members (113) to define a drainage compartment (114) between the first and second outer surfaces. At least one of the first and second outer surfaces includes through-openings (115) for fluid connection with the drainage compartment (114), and wherein the outer surfaces (111, 112), when one disregards the through-openings, are formed of a material extending continuously throughout the outer surfaces. The filtration layer (12, 13) coats the outer surface such that the membrane material (Continued)

penetrates the through-openings (115) to anchor the filtration layer (12, 13) to the support structure (11).

17 Claims, 9 Drawing Sheets

(51) Int. Cl.
 *B01D 67/00* (2006.01)
 *B01D 69/12* (2006.01)
 *B01D 63/08* (2006.01)
 *B01D 65/02* (2006.01)
(52) U.S. Cl.
 CPC ..... *B01D 67/0002* (2013.01); *B01D 67/0013* (2013.01); *B01D 69/06* (2013.01); *B01D 69/10* (2013.01); *B01D 2313/146* (2013.01); *B01D 2321/04* (2013.01); *B01D 2323/42* (2013.01); *B01D 2323/46* (2013.01)
(58) Field of Classification Search
 CPC .............. B01D 67/002; B01D 67/0046; B01D 67/0088; B01D 69/06; B01D 69/10; B01D 69/105; B01D 2201/04; B01D 2201/0415; B01D 2239/065; B01D 2325/24
 See application file for complete search history.

(56) References Cited

U.S. PATENT DOCUMENTS

| | | | |
|---|---|---|---|
| 2005/0087070 A1* | 4/2005 | Odaka | B01D 69/10 96/11 |
| 2005/0263452 A1* | 12/2005 | Jacobson | B01D 63/16 210/484 |
| 2008/0000827 A1 | 1/2008 | Bruss | |
| 2008/0156730 A1 | 7/2008 | Heinen | |
| 2011/0198282 A1* | 8/2011 | Chu | B01D 39/1615 210/500.29 |
| 2012/0160750 A1* | 6/2012 | Choi | B01D 63/081 210/151 |

FOREIGN PATENT DOCUMENTS

| | | |
|---|---|---|
| EP | 1 174 177 | 1/2002 |
| EP | 1 215 037 | 6/2002 |
| EP | 1 462 154 | 9/2004 |
| EP | 1 543 945 | 6/2005 |
| JP | 8-10587 | 1/1996 |
| JP | 8 010587 | 1/1996 |
| JP | 9-313905 | 12/1997 |
| WO | WO 2006/091157 | 8/2006 |
| WO | WO 2009/135529 | 11/2009 |
| WO | WO2011055889 * | 2/2011 |

OTHER PUBLICATIONS

International Search Report from International Application No. PCT/EP2013/052161 dated Mar. 27, 2013.
International Preliminary Report on Patentability and attachments in corresponding PCT, PCT/EP2013/052161, dated May 16, 2014.

* cited by examiner

BACKWASHABLE FILTRATION ELEMENT

This application is a National Stage Application of PCT/EP2013/052161, filed 4 Feb. 2013, which claims benefit of Ser. No. 12/153,928.2, filed 3 Feb. 2012 in Europe and which applications are incorporated herein by reference. To the extent appropriate, a claim of priority is made to each of the above disclosed applications.

The present invention is related to filtration members or filter elements of the flat or planar type, for use in solid-liquid, liquid-liquid or gas-liquid separation.

Filter elements of the above type typically comprise a rigid planar support structure and one or more filtration layers, usually made of organic membrane material, provided on at least one side and typically on both sides of the support structure.

Support structures known in the art typically have the sole function of supporting the filtration layers, in which case a distinguishable drainage layer needs to be placed between the support structure and the at least one filtration layer in order to resist negative pressure caused by internal permeate suction operation. An example of a filter element with such a support structure is disclosed in EP 0 602 560 A1 describing a filtration membrane cartridge comprising a pair of filtering membranes which are disposed on both surfaces of a membrane supporting plate. Spacers or drainage layers, such as felt-like non-woven cloths, are provided onto both surfaces of the membrane supporting plate, between the membrane supporting plate and the filtering membranes. The filtering membranes are individually fused with the supporting plate along peripheral edges only. The supporting plate incorporates on both surfaces a plurality of channels which are open towards the filtering membranes and the drainage layers. The channels provide a fluid passage for the permeate to an outlet.

A similar filter element is described in US 2003/0150808. With regard to FIGS. 7-9 of that document, a separation element is described comprising a rigid supporting plate with channels provided therein on both outer surfaces. On both sides of the supporting plate, a channel member and a separation membrane are loosely stacked. A frame is provided around the supporting plate to secure the supporting plate, the channel member and the separation membrane along peripheral edges. The document furthermore describes that the separation membrane itself is reinforced by a porous support which is impregnated by the membrane material.

Another type of filter element is known from US 2008/000827, wherein the support structure is formed of a pair of outer layers spaced apart and secured to each other by an inner layer comprising a plurality of nub-like bumps. The space between the outer layers thus created forms a drainage layer. The outer layers comprise holes for conducting filtrate into the drainage layer. Filtering (membrane) layers are provided on the outer layers, with fluid-permeable gauze in between. The different components are welded, pressed, or glued in edge regions to make the element fluid tight.

Yet another filter element is known from US 2008/156730, which is formed of an extruded spacer structure comprising outer membrane support members being spaced apart by longitudinal walls forming a flow space between the support members. The support members are provided with perforations and the membranes are attached to the support members by gluing or welding.

The same document also describes to cast or to extrude the spacer structure and the membranes together as one membrane unit, but in such case the spacer structure must be of a porous material and cannot comprise perforations.

An advantage of the filter elements of the above types is that the supports can be manufactured at low cost and are readily available on the market.

The edge regions of these filter elements are sealed to make them fluid-tight and the resulting cartridges are used in filtration modules, where they are mounted spaced apart in a series or parallel arrangement. A liquid suspension, emulsion, solution, dispersion or other liquid to be filtered is made to flow between the cartridges. The cartridges are all connected to a suction unit for maintaining a pressure difference between the outside and inside of the cartridge by which the filtrate passes through the membranes and collects in the central drainage compartment.

The filtration (membrane) layers are typically pre-made or pre-formed prior to stacking on the support or backing structure, and are self-supporting. They are typically made of an organic material, having a surface layer with very small pores defining the filtration characteristics. More internally, the pores of the membrane layers are larger towards the backing side so that a high flow rate may be maintained. The liquid flow across the membrane causes solid particles and other impurities to stick at the outside of the membrane, thereby creating a so-called cake layer, which prevents other liquid to easily pass through.

The cake layer needs to be removed at regular intervals, in order to avoid reducing the flow rate too much. This may be done mechanically, such as by coarse air bubbling. In the alternative, the membranes may be cleaned chemically.

Air bubbles are introduced in the non-filtered liquid just below the filtration module. They raise between the adjacent filtration cartridges, thereby generating two effects. A first effect is that they initiate and maintain a sufficient gas/liquid flow between the cartridges, therewith equalising the sludge concentration with the bulk. A second effect is that they help to remove the cake layer.

In some cases, in particular with membrane bioreactors working with sludge of high solids concentration, coarse air bubbling will not suffice as a mechanical means for removing the cake layer.

In bioreactors equipped with capillary membranes instead of the abovementioned planar filtration elements, it is well-known to apply backwashing as a means for mechanically removing the cake layer. Backwashing is carried out at regular intervals. During backwashing, the flow through the membrane is inversed, as is also the pressure difference. To obtain an effective backwash operation, the inverse flux (flow rate) should be about 1.5 times the filtration flow rate, or higher.

However, all of the above indicated planar filter elements, in particular the large-sized ones, cannot withstand backwash pressures. Exceptionally, where the membrane layers are fused or bonded onto a support structure at the edge regions, a minimal backwash pressure may be supported. However, the typical backwash pressures will cause the filter or membrane layers to be pushed away from the support structure, i.e. to bulge away from the backing structure, with the effect that the membrane layers tear apart and get damaged. This bulging may cause an undesired contact of successive (facing) membranes, thereby severely obstructing filtering capacity. For this reason a novel way of mechanical cleaning this type of filter elements was developed. It is called relaxation and involves continuing coarse air-bubbling with intermittent filtration. Relaxation is however not as effective as backwashing.

A second drawback of the above indicated planar filter elements, which have the membrane layers secured solely at the edge regions, such as by gluing, welding or otherwise, is that the membrane layer(s) experience significant viscous drag as a result of the upward flow of the non-filtered liquid/air mixture. This viscous drag causes tensile stresses in the membrane layers which results in creep and elongation over time, and eventually tearing apart of the membrane layers.

The larger the size of the filter elements, the more pronounced the above mentioned effects are. Hence, the membrane layers enlarge/stretch over time and give rise to the formation of folds in the membrane layer to cause a waving pattern particularly located in the top region during the filtration phase when the membrane layers are sucked against the rigid supports. This waving pattern is stopped at the upper edge by an attachment to the support, such as a weld seam, and it is particularly in this spot that the membrane layer is prone to tearing and damage. During the relaxation phase the tendency to damage the membrane layers is even more pronounced and the too-large membrane layers even start flapping and get very sensitive to fatigue failure.

This viscous drag problem is addressed in JP 08-10587, which describes to weld the membrane layer on a rigid backing structure in a distributed manner over the filtration surface. The backing structure is similar to that of US 2008/156730. The weld seams are provided between drainage holes in the outer surface of the backing structure. Even though the proposed solution reduces the above flapping problems, the weld seams form weak spots and aeration and backwashing will cause the membrane to break at the weld seams.

Yet another disadvantage of the filter elements described above is that, due to a stacking of the (reinforced) membrane layer and the drainage layer at both sides of the supporting plate, the filter element tends to become voluminous and therefore the filtration area per unit volume is reduced.

EP 1462154 only partially addresses the above problem by reducing the thickness of the membrane layer. This document describes to calender or emboss a non-woven fabric used as porous support for the membrane layer in order to obtain a smooth front surface and a coarse rear surface. The membrane solution is coated on the smooth surface so as to prevent it from reaching the rear surface. EP 1462154 only addresses thickness issues of the membrane layer itself. Consequently, the structure of the entire planar filtration element, with support, drainage layers and membrane layers as previously described remains unaltered. This is not surprising, since the EP 1462154 membrane layers are only described for use in spirally wound filtration cartridges.

Yet the support structures described in the above documents provide an advantage of being sufficiently rigid, which is beneficial in large-sized filtration modules or where membranes are subjected to intense bubbling. This is particularly the case in high (or deep) filtration systems, in which the air bubbles expand as they rise due to decreasing hydrostatic pressure. This causes considerable intermittent lateral forces on the filter elements. In such cases a rigid support provides the advantage of minimizing the lateral deflection of the filter element. It is therefore an object of the present invention to keep the rigidity advantages of the support and further obviate the disadvantages of the prior art, in particular as regards the interaction between the membrane layer(s) and the support.

It is therefore an aim of the present invention to provide a planar filter element incorporating same or similar backing structures of the prior art filter elements as described in paragraphs 5, 6 and 18 above, and which is furthermore backwashable at high, effective backwash pressures and hence does not show the disadvantages of the prior art filter elements. It is an aim of the present invention to provide a filter element which tolerates without any problems the upward viscous drag from the non-filtered liquid onto its membrane layers.

In addition, it is an aim to provide such filter elements which are easy to manufacture and economical. It is therefore also an aim of the invention to provide a method of producing such filter elements.

According to the present invention, there is therefore provided a filtration element of the flat or planar type as set out in the appended claims. Planar filtration elements according to the invention comprise a planar support structure and at least one filtration layer made of an advantageously polymeric membrane material. The planar support structure comprises first and second opposite outer surface layers, which are spaced apart and secured to each other by spacing members extending between the first and second outer surface layers. The spacing members are arranged at a multitude of points distributed throughout the support structure. Between said first and second outer surface layers is thus defined a drainage compartment, which is configured to drain filtrate.

At least one of said first and second outer surface layers comprises through-openings distributed throughout the outer surface layers. The through-openings are in fluid connection with the drainage compartment. However, as an advantage, the through-openings do not have internal connections between one another within the outer surface layer. As an advantage, the at least one outer surface layer, when one disregards the through-openings, is formed of a material extending continuously throughout the outer surface layer.

The at least one filtration layer covers the at least one outer surface layer, including the through-openings. According to an aspect of the invention, the membrane material of the filtration layer penetrates the through-openings, thus forming protuberances towards the drainage compartment. As an advantage, the protuberances have sizes larger than sizes of the through-openings, thus forming undercut-type anchors. Such anchors provide strong anchoring of the filtration layer to the support structure.

According to another aspect of the present invention, there is provided a method of producing filtration elements of the above type as set out in the appended claims. Methods of the invention comprise providing a planar support structure comprising first and second opposite outer surface layers. The first and second opposite outer surface layers are spaced apart and secured to each other by spacing members extending between the first and second outer surface layers. The spacing members are arranged at a multitude of points distributed throughout the support structure. Between said first and second outer surface layers is thus defined a drainage compartment. As an advantage, the outer surface layers are formed of a material extending continuously throughout the outer surface layers.

In methods according to the invention, at least one of said first and second outer surface layers, and possibly both, is provided with through-openings disposed at a multitude of points distributed throughout the layer. The through-openings are in fluid connection with the drainage compartment. However, as an advantage, the through-openings do not have internal connections between one another within the outer surface layer.

In a next step of methods according to the invention, said at least one outer surface layer is coated with a membrane forming liquid solution to obtain a coated support structure. The solution is coated/applied on top of the at least one outer surface layer and penetrates the through-openings. At least one membrane forming step is subsequently applied to the coated support structure to obtain a filtration layer from the coated solution. The filtration layer is composed of an advantageously polymeric membrane material and covers the at least one outer surface layer. In addition, the membrane forming step also affects the solution which penetrated the through-openings, which forms protuberances of membrane material projecting from the filtration layer towards the drainage compartment, through the through-openings. The protuberances have sizes larger than sizes of the through-openings thus forming undercut-type anchors, which anchor the filtration layer to the support structure.

Additional advantageous aspects are set out in the dependent claims.

Aspects of the invention will now be described in more detail with reference to the appended drawings, which are non-limiting and wherein.

Figure 1:
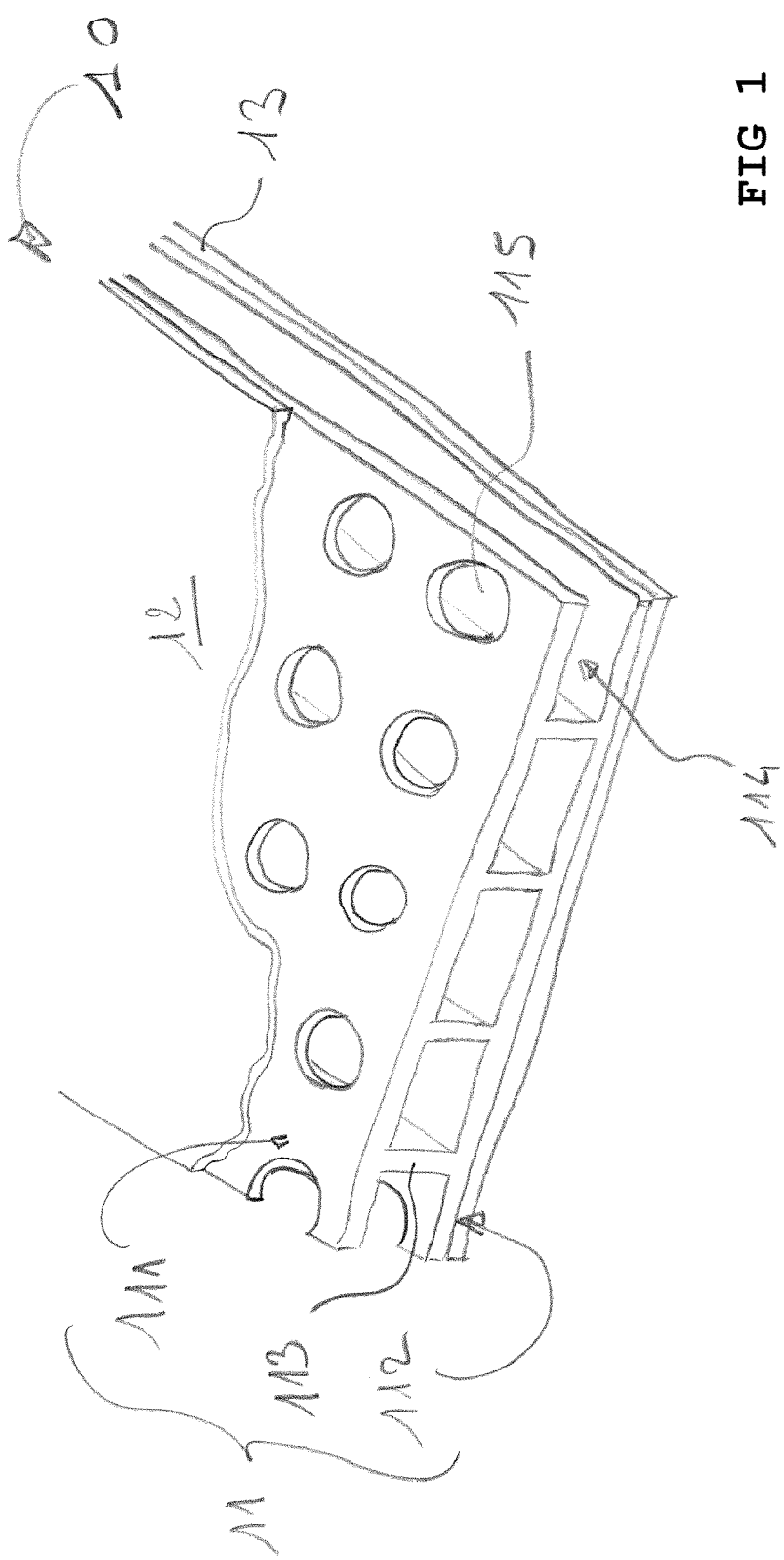
FIG. 1 represents a perspective view of a section of a possible filter element according to the invention.

Referring to FIG. 1, filter element 10 comprises a planar and advantageously rigid support structure 11 and a filtering layer 12, 13 on one or both support surfaces 111 and 112. The support structure 11 hence comprises two opposite outer surfaces or surface layers 111 and 112 which may have the appearance of a skin, sheet, foil or even a multi-layer sheet. The outer surfaces comprise through-openings 115 designed to enable anchorage of a filtering (membrane) layer as will be described later.

Outer surfaces 111 and 112 are spaced apart by a drainage structure. The drainage structure advantageously comprises an installation of spacing members 113, spacing apart outer surfaces 111, 112 and connecting them to each other. Support structures according to the present invention thus distinguish an inner drainage zone or compartment sandwiched between two opposite anchorage zones. This composition may be brought about integrally as one unit in a single formation step, or may arise by assembling the distinguishable parts as separate units into one.

Spacing members 113 are themselves spaced apart to provide the drainage zone between the two outer surfaces 111, 112. This drainage zone is an open structure, allowing the filtrate to be collected and to be drained off. As will be shown, the installation of spacing elements forming the drainage zone may assume various designs and any design which is able to perform the stated function may be used in the present invention.

The spacing members 113 are not just present at the edges, but are advantageously distributed throughout the support structure 11 to provide securement of the outer surface layers 111, 112 to each other at a multitude of points, which are advantageously regularly or uniformly distributed throughout the support.

The spacing members 113 may be shaped as ridges extending—either continuously or intermittently—along one dimension of the support structure 11, as shown in FIG. 1. They may extend along two dimensions, such as arranged as lines forming an S or zigzag shape. Equally suitable spacer member installations may comprise spacer members shaped as pillars, nubs, pleated sheets, corrugated sheets, etc. Any installation of spacing members spacing apart the support outer surfaces at an advantageously predetermined distance and securing the outer surfaces to each other while providing a drainage compartment will be suitable for use within the present invention.

The drainage compartment involves passages for the filtrate or permeate to be drained off. These passages may have the shape of channels 114 as shown in FIG. 1, but equally suitable passages may be internally unilateral or multi-lateral corridors, e.g. passages in between regularly arranged nubs or ridges. The spacing members 113 may as well be formed of a porous and possibly liquid-permeable material or structure.

As will be explained further below, the passages 114 drain permeate out of the filter element towards e.g. a collector (not shown).

It is not required that all the passages 114 be interconnected in the support structure 11 itself, as long as each passage is in fluid connection with an outlet. The filter element can have several outlets.

The outer surfaces 111 and 112 are provided with through-openings 115, being advantageously deliberately made holes, such as perforations, for conducting the filtrate into the drainage compartment (into passages or channels 114).

As can be seen from FIG. 1, the through-openings 115 connect the outside of the outer surface layers 111, 112 directly to the channels 114. The through-openings are isolated holes, which are not interconnected within the outer surface layers 111, 112, meaning that the through-openings do not have internal connections. The fact that the through-openings 115 are not interconnected (or do not have internal connections) refers to the fact that a liquid, such as water, is not able to pass from one through-opening to an adjacent one within the surface layer. It also means that the support outer surfaces are not permeable to liquids when one disregards the through-openings 115. In this regard it will be convenient to note that the surface layers, disregarding the through-openings, may be porous, but the pores are not interconnected, viz. do not provide interconnectivity between through-openings 115.

Support outer surface layers 111, 112 are formed of a material extending continuously and advantageously uniformly throughout the surfaces, when one disregards the through-openings 115 made therein. This means that, apart from the through-openings, the support outer surfaces form a continuous, advantageously uniform and advantageously solid material surface without any breaks.

The support outer surface layers, when disregarding the through-openings, may exhibit a certain degree of porosity, as long as such pores are not interconnected and/or do not provide liquid permeability.

The importance of surface layers without interconnected through-openings can be found in the fact that such surface layers exhibit a higher stiffness, which is beneficial for the rigidity of the support structures used in filter elements according to the present invention.

Support structures of filter elements according to the invention may be made by extrusion, by laminating, by moulding or casting, by rapid prototyping, by additive manufacturing or by any other available technique. In case the components of the support structure, viz. the support outer surface layers 111, 112 and the spacing members 113, are assembled by lamination, all or part of these components can be made of a continuous sheet, film or foil by extrusion, rolling and any other technique available to this end.

Suitable materials for the support structure 11 (outer surfaces 111, 112 and spacing members 113) include, without limitation, polyethylene (PE), polypropylene (PP), poly (ethylene terephthalate) (PET), possibly modified by copolymerization such as PET-G (Glycol-modified), amorphous PET (A-PET), PET-GAG (a multilayer PET-G foil with A-PET core), Nylon, polycarbonate (PC), polystyrene (PS), acrylonitrile-butadiene-styrene (ABS), polychlorotrifluoroethylene (PCTFE) and polyphenylene sulphide (PPS). The support structures may be made of metal, such as sheet metal.

The through-openings 115 can be created in the support structure outer surfaces 111, 112 only after the support structure 11 has been integrally made or assembled. Alternatively, the through-openings 115 can be formed in the outer surfaces before the outer surfaces are secured to the spacing members (e.g. by lamination).

It will be convenient to note that meshes in a fabric are not to be considered as through-openings as referred to in the present invention, since the mesh openings are clearly interconnected. Also, a fabric cannot generally constitute a support outer surface layer according to the invention, since it is not made of a material extending continuously throughout an outer surface. Indeed, a fabric—be it knit, woven, or non-woven—generally consists of a plurality of entangling and interlocking fibres or yarns. Notably, at the points of entanglement or interlocking, the material structure presents a discontinuity.

The support outer surface layers 111, 112 hence advantageously do not consist of fabric (either knit, or woven). Advantageously, they do not consist of a non-woven fabric. A fabric refers to any structure which consists exclusively of interlocking and/or entangling fibres, filaments or yarns formed into a web.

However, the support outer surface layers 111, 112 may comprise fibres, filaments (monofilaments, multifilaments), or yarns, as long as the fibres, filaments or yarns are embedded in or impregnated with a matrix which closes the connections between the pores/meshes and therefore also any interconnection between the through-openings 115. Advantageously, the matrix accounts for at least 20% by volume of the solids (total solids, excluding any porosity) forming the support outer surface layer 111, 112, advantageously at least 30% by volume, advantageously at least 40% by volume, advantageously at least 50% by volume, advantageously at least 60% by volume. Such a matrix may be formed of a thermoplastic material. Alternatively, the matrix may be formed of a thermosetting material. The fibres, filaments or yarns can be made of glass, carbon, or basalt.

By providing non-interconnected through-openings 115, the disposition and size of filtrate/permeate evacuation openings 115 can be tailored without compromise on the stiffness properties of the outer surface layers 111, 112. As will further be explained, having the possibility of using stiff (in-plane), or inelastic (non-stretch) outer surface layers 111, 112 allows for obtaining rigid supports, such as the ones described in US 2008/0156730 and US 2008/0000827. Whereas the rigidity and stiffness of these prior art supports prevented any good attachment of the membrane layers to the support, the present inventors have found a solution to this problem, and filter elements according to the present invention therefore provide the benefits of two worlds in one single product, i.e. rigid, stiff supports and unrivalled membrane anchorage to such supports.

The support structure 11, including the surface layers (111, 112) having through-openings 115, is advantageously rigid. It advantageously has a flexural modulus of at least 150 MPa, advantageously at least 250 MPa, advantageously at least 350 MPa, advantageously at least 500 MPa, advantageously at least 700 MPa, advantageously at least 900 MPa. The flexural modulus can be smaller than or equal to 5000 MPa, advantageously smaller than or equal to 50 GPa, advantageously smaller than or equal to 100 GPa.

Indicated values of flexural modulus can be determined based on ISO standard 178 and based on a specimen which is 80 mm long and 10 mm wide with the thickness of the specimen spanning the total thickness of the support structure in a direction perpendicular to the support outer surfaces, and the length of the specimens being all oriented along an axis parallel to a plane of the outer surface layers and having the highest resistance to bending. The test bench should be configured such that the span L according to ISO 178 measures 70 mm and a speed of 5 mm/min should be used.

It will be convenient to note that the above values of flexural modulus can be obtained even though the constituents of the support structure, viz. the support outer surfaces and possibly the spacing members are flexible in nature. This can be achieved by securing the spacing members to both the support outer surface layers in an advantageously rigid way and by using non-stretch and advantageously stiff support outer surface layers, so as to obtain a rigid scaffold-like structure or panel delimited by the support outer surfaces.

The rigidity and flexural modulus of support structures according to the invention can be increased by using fibre reinforced polymeric materials for such structures, such as materials reinforced with glass fibres, carbon fibers, or basalt fibers.

A filtering or membrane layer 12, 13 is provided on top of each outer surface 111, 112. It may be made of any (polymeric) membrane material as known in the art. According to the invention, filtering layers 12, 13 are formed directly on the outer surfaces 111 and 112, avoiding the use of pre-made filter layers.

Hence, a liquid formulation forming the filtering layers 12, 13 (i.e. a membrane forming dope) is applied on the support outer surfaces 111, 112. The liquid formulation hence will cover the outer surface layers 111 and 112 including the through-openings 115. By appropriate selection of, amongst others, the size, incidence and disposition of the through-openings 115, the viscosity and feed rate of the dope, the liquid dope will additionally penetrate into the through openings 115 without however clogging passages 114. After solidification of the membrane dope, such as by a phase separation process, the membrane layers 12, 13 are strongly physically anchored to the support outer surfaces 111, 112 in the through-openings 115.

Figure 2:
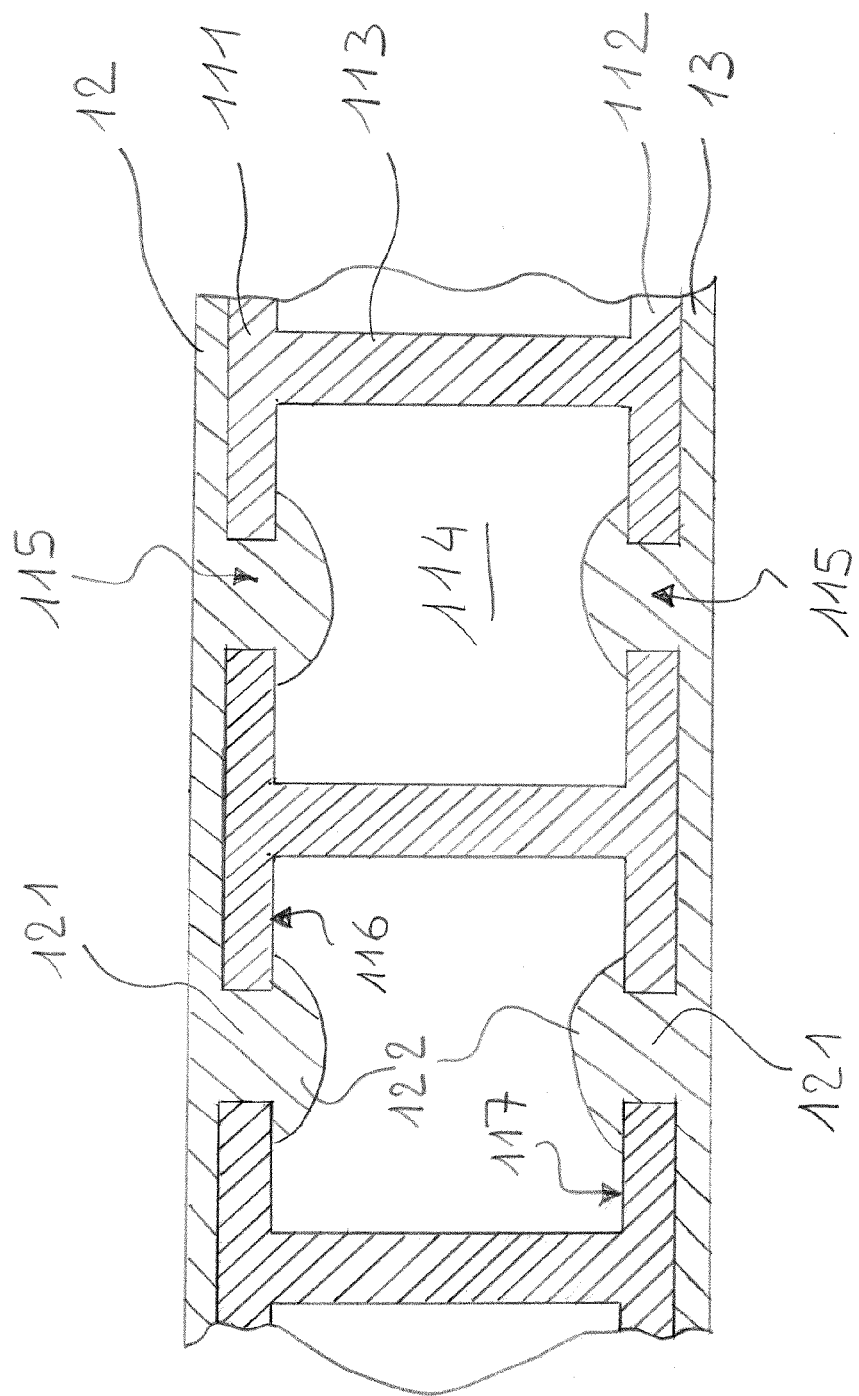
FIG. 2 represents a cross section of the filter element of FIG. 1.

FIG. 2 shows a cross section of a support structure 11, wherein membrane material forms filtering layers 12, 13 on the outer surfaces 111 and 112. Additionally, membrane material penetrates the through-openings 115 to form protuberances at the back (inner) side 116, 117 of outer surface layers 111 and 112 respectively. Such protuberances act as plugs and may be in the form of heads 122 having a size exceeding the (smallest) size of the through-openings 115 and which hence engage with the support outer surface 111. The heads 122 are connected to the filtering layers 12, 13 through stems 121 extending through the through-openings 115 and hence anchor the filtering layers 12, 13 to the support structure 11.

The through-openings 115 are preferentially uniformly or regularly distributed over the support outer surfaces 111, 112, such that corresponding distributed anchor points for the filtering layers 12, 13 are obtained in the support outer surfaces 111, 112.

The heads 122 and stems 121 hence form mushroom-type protuberances, which is a type of undercut, providing anchoring of the filtering layer 12, 13 by interlocking between the protuberance and the outer surface layer 111. An undercut is a term taken from moulding and etching technology and with regard to the present invention refers to a shape of a body preventing it from being ejected or pushed through the through-openings 115 towards the outside (towards the filtration layer 12). An undercut-shaped body interlocks with the body in or around which it is shaped. This is achieved by the protuberances having a size at a first location which is larger than the size of the through-openings 115 at a second location, the second location being interposed between the filtration layer and the first location, or the second location being outwardly located relative to the first location. In this regard, it will be convenient to note that, as will be described further with reference to FIG. 5, the first location need not be located past the through-opening (at back sides 116, 117), but can be located along or inside the through-opening. Since the protuberance 121, 122 is integrally formed with the filtration layer, the undercut provides anchoring of the filtration layer to the support. It will also be convenient to note that, depending on the coating parameters, heads 122 of adjacent protuberances may touch or become integral with one another at the back sides 116, 117 of the surface layers 111, 112.

Referring again to FIG. 2, it will become evident that the interfaces between the outer surface layers 111, 112 and the filtering layers 12, 13 respectively are substantially flat, except for the protuberances 121, 122. The substantially flat interface, which has a planarity advantageously equal to that of the outer surface of surface layers 111, 112, extends between the isolated through-openings.

Since filtration is primarily determined by the surface pores of the filtering layers 12, 13, which are interconnected with the internal pores which are gradually larger, the filtrate which enters layer 12 can be easily conducted towards the through-openings 115, from where it is guided into the passages 114 in the internal drainage structure. The penetration of membrane material in the through-openings 115 hence does not affect the filtrate flux in any negative way.

It is hence obtained that the membrane layers or filtering layers 12, 13 can be effectively anchored to the outer surface layers 111, 112 of the support structure 11 at a multitude of distributed points. This enables the membrane not only to withstand viscous drag from the non-filtered liquid flowing along, but also to withstand higher backwash pressures compared to prior art filtration elements having similar support structures. Furthermore, the support structure of filtration elements according to the invention have equivalent rigidity to those of the prior art, since the number and size of the through-openings only influences the flexural strength of the support to a minor extent and since the rigidity provided by the installation of spacing members is not affected.

Figure 3:
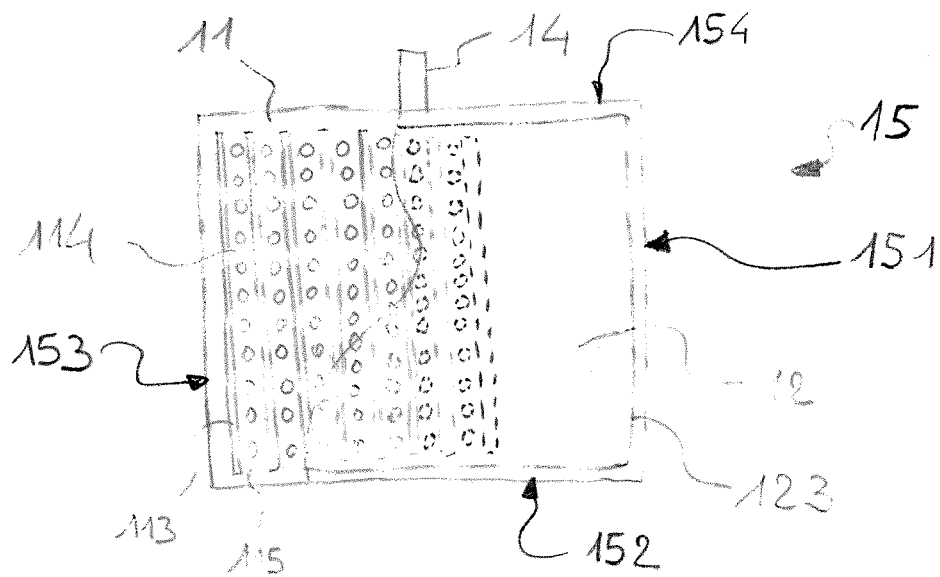
FIG. 3 represents a plan view of the filter element of FIG. 1.

Towards operation and referring to FIG. 3, the support structure 11 is fluid-tightly sealed along its edges 151-154, forming cartridge 15, and all passages 114 communicate with a main outlet 14 of cartridge 15. The filtering layer 12 is advantageously fluid-tightly sealed to the support structure 11 (outer surface 111) along its edges 151-154, such as by (ultrasonic) welding, lamination or gluing. This may provide a (weld) seam 123. Hence, along a peripheral edge 151-154 of the support structure 11, the support outer surfaces 111, 112 advantageously do not comprise through-openings 115.

It will be convenient to note that other ways of edge-sealing are possible, such as by framing the support structure and possibly the filtering layers.

It will also be convenient to note that the membrane layers 12, 13 are porous throughout (in all directions of space)—also in the anchor points (openings 115)—and that, except for the edge regions of the filter element 10, the membrane layers do not need to comprise any additional anchoring means, such as weld seams, which render the membrane locally non-porous. It is noted that the pores inside the membrane layers are interconnected.

The support structure, in particular the installation design of spacing members, represented in FIGS. 1-3 is just an example of a possible spacing member organization that can be used in the present invention. Suitable support structures are known in the art and can e.g. be obtained by extrusion of a thermoplastic polymer to form a ribbed double-skinned polycarbonate sheet, such as Makrolon® multi UV sheets (Bayer, Germany). Other suitable examples are POLISNAKE® polycarbonate panels (Politec Polimeri Tecnici SA, Switzerland) described in EP 1543945, polypropylene KIBO X-panels and KIBO M-panels (KIBO Kunststoffe GmbH, Germany), and TRIPLEX 3 and TRIPLEX 5 composites (TRIPLEX Kunststoffe GmbH). Laminated panels, such as tri-laminates as described in US 2008/000827 or EP 1215037 with outer skins spaced apart by nubs, or tri-laminates made by lamination of two sheets to double side ribbed sheet, or such as bi-laminates (two laminated ribbed sheets), are suitable as well.

Figure 4:
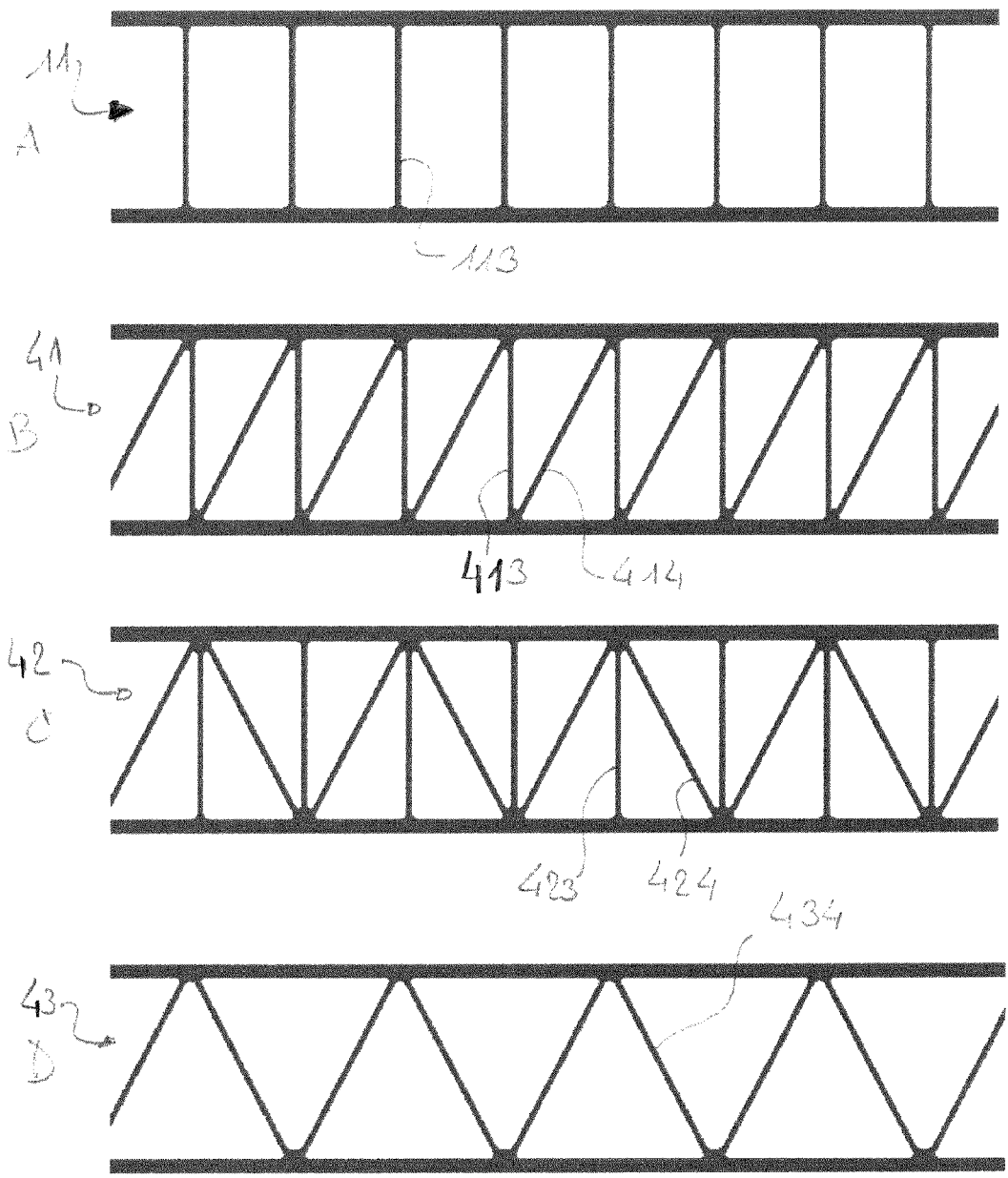
FIG. 4 represents, in cross-sectional view, non-limitative examples of support structures that are suitable in filter elements of the present invention.

In the above structures, the spacing members 113 between the support outer surface layers 111, 112 can assume various shapes or profiles, as long as they allow to form passages 114 assuring the draining of filtrate. FIG. 4 represents cross sections for a number of examples of support structures, in particular installations of spacing members, e.g. H-, M-, or X-shape. By way of example, support structures 41-43 comprise oblique connecting members 414, 424, 434, in addition or alternative to straight ridges 113, 413, 423. The oblique connecting members allow for increasing the flexural stiffness of the support structure.

To function as a support structure according to the invention, the outer surface layers of the above mentioned support structures are perforated, such as by laser or by mechanical perforation techniques, e.g. punching such as advantageously hot needle punching, piercing, etc., to provide through-openings 115. The through-openings 115, which are isolated from one another, are advantageously arranged in a regular pattern, and are advantageously uniformly distributed over the support outer surface layers 111, 112.

In case the support structure is made by lamination, the through-openings 115 can be made in sheets forming the outer surfaces, prior to laminating the sheets to form a support structure.

The through-openings advantageously have a (largest) linear size larger than or equal to 0.1 mm, advantageously larger than or equal to 0.2 mm, advantageously larger than or equal to 0.3 mm. The through-openings advantageously have a size smaller than or equal to 2 mm, advantageously smaller than or equal to 1.5 mm, advantageously smaller than or equal to 1.2 mm, advantageously smaller than or equal to 1.0 mm. Too small through openings would prevent the membrane material to penetrate effectively in the openings and provide a too weak anchorage. This would result in a too low backwash pressure resistance. Too large holes would cause clogging of the channels drainage layer with membrane dope, which would increase the internal flow resistance significantly and would require a too large volume of membrane dope. In addition, smooth coating may be problematic when the perforations are too large and large openings decrease the mechanical strength of the support considerably.

The support outer surface advantageously exhibits an open area (porosity due to the through-openings) of at least 2%, advantageously at least 5%, advantageously at least 10%, advantageously at least 15%, advantageously at least 20%, advantageously at least 25%, advantageously at least 30%, advantageously at least 35%. The open area is advantageously at most 70%, advantageously at most 60%, advantageously at most 55%, advantageously at most 50%. The open area of the support outer surfaces should advantageously be not too low to provide for sufficient flux through the support outer surface layers on the one hand, but neither too high in order not to compromise the stiffness of the support structure on the other. The open area refers to the area of the through-openings per unit total area of the outer surface (including the through-openings), expressed in percentage values. In defining the total area of the outer surface, the peripheral edges where the membrane layer is sealed fluid-tightly, are disregarded.

There is no restriction on the cross-sectional shape of the through-openings 115, i.e. they may be circular, square, polygonal, star-shaped or slit-shaped holes, or holes of any other suitable shape.

Advantageously, the through-openings have a tortuosity equal to 1 (defined as the ratio between the length of the shortest way through the holes to go from the one to the other side to the straight distance between the two sides). This facilitates the penetration of membrane material into the through-openings, increases permeability and facilitates obtaining a uniform anchoring effect of the membrane as will be described further.

A tortuosity equal to one means that the shape of the through-openings is advantageously that of a prism or cylinder, advantageously a right prism or a right cylinder. Advantageously, the through-openings have a constant cross-section throughout the thickness of the support outer surface layer. The shape of the through-openings can be frusto-conical as well, advantageously emanating from a right cone with circular, or polygonal base, or a base of any other suitable shape.

Figure 5:
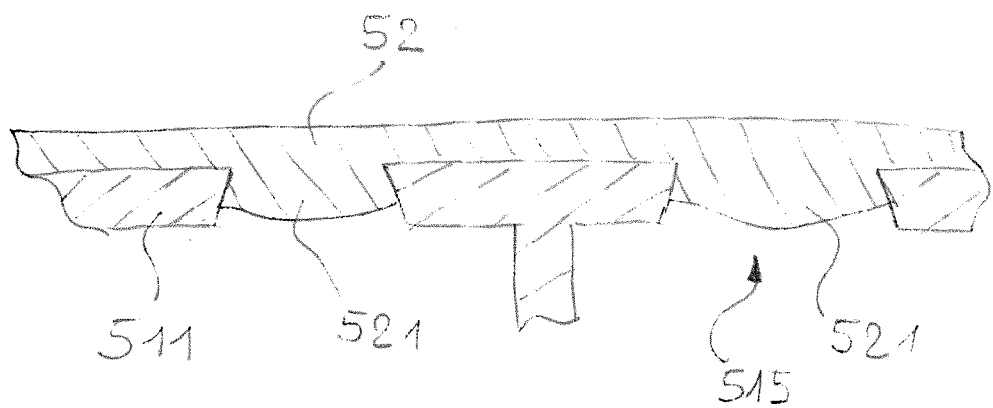
FIG. 5 represents a cross section of another example of filter element according to the invention.

As already noted above, a penetration of the membrane material completely through and beyond the through-openings 115 is not required, as long as a physical (mechanical) anchoring effect is obtained, such as with a shape providing an undercut. As shown with regard to FIG. 2, the anchoring effect is advantageously provided mechanically, by engagement. The penetrating parts 121, 122 of the membrane material act as mushroom-like plugs in the through-openings 115. Referring to FIG. 5, and depending on the cross sectional shape of the through-hole, it becomes clear that the membrane material need not penetrate beyond the through-opening. As shown in FIG. 5, through-openings 515 may have e.g. oblique or inclined walls, such that the aperture expands towards the inside of the support structure. In that case, the protuberances 521 of membrane material may only partially fill the through-openings 515. By so doing, the protuberances acquire conical shape hence forming an undercut with regard to the aperture of the through-opening 525 at the outer surface of layer 511, thus providing for sufficient anchoring of the membrane layer 52 to the support outer surface 511.

Figure 6:
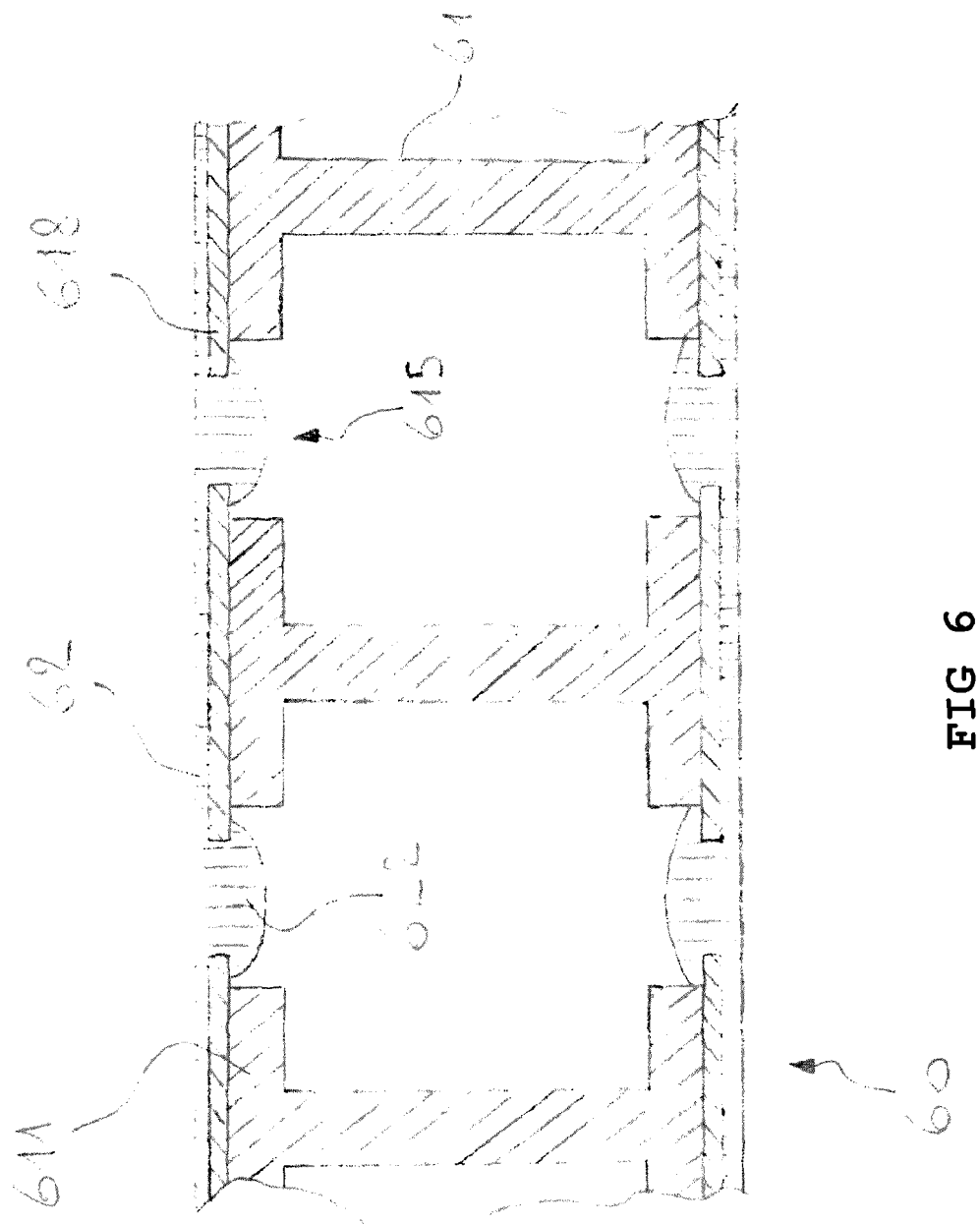
FIG. 6 represents a cross section of yet another example of filter element according to the invention.

FIG. 6 shows a planar filtration element 60 having an alternative configuration to that of FIGS. 2 and 5. The outer surface layer of the support structure is formed by stacking two perforated sheets or layers 611 and 618. Sheets 611 and 618 both feature through-openings 615 arranged in a same or corresponding pattern. The openings or holes of outer sheet 618 are however smaller than corresponding ones of inner sheet 611. The sheets 611 and 618 are advantageously disposed such that corresponding through-openings are co-axially aligned. Thereafter, they are secured, such as by welding, gluing or lamination.

The support structure of FIG. 6 can e.g. be obtained by provision of a support structure 61 similar to support structure 11 of FIGS. 1 and 2, however with possibly larger through-openings than the openings 115 in FIGS. 1 and 2. A perforated foil or sheet 618 can be laminated or secured otherwise on top of the outer surface layers 611 of the support structure 61.

When applying membrane dope on the outer sheet 618, in order to develop membrane layer 62, the dope will penetrate the through-openings 615 and form mushroom-like plugs extending to the back side of the outer sheet 618. The plugs comprise engagement heads 622 forming an undercut-type anchor relative to the through-opening 615 of the outer sheet 618 which anchors membrane layer 62 to the outer sheet 618. Heads 622 need only engage the outer sheet 618 in order to provide for effective anchoring.

An advantage of the above configuration, is that the outer sheet 618 can be made thin, and consequently the amount of dope material required to form the plugs can be minimised. At the same time, the rigidity of the support structure is not affected since the thickness of inner sheet 611 can be selected as desired.

When the edges of the through-openings 115, 515, 615 are made sufficiently smooth, most effective anchoring protuberances are advantageously obtained. Therefore, excessive burrs around the through-openings should be avoided.

Referring again to FIG. 1, it will be advantageous when the outer surfaces of support outer surface layers 111 and 112 are made sufficiently smooth such that the thickness of the membrane layers 11, 12 can be minimised.

Advantageously, the outer surfaces of the surface layers 111, 112 are suitably planar in order to enable coating of filtering layers of sufficiently uniform thickness. Advantageously, the distance between two parallel planes running through respectively the external-most (highest) point and the internal-most (lowest) point of the outer surface of surface layer 111, 112 is smaller than 1000 μm, advantageously smaller than 750 μm, advantageously smaller than 500 μm. Planarity measurements will be performed on square samples with sides of 100 mm.

Advantageously, the support outer surfaces 111 and 112 are formed with sheets, foils or skins having a thickness of at least 100 µm, advantageously at least 150 µm, advantageously at least 200 µm. Such skin, foil or sheet advantageously has a thickness not exceeding 750 µm. The total support structure 11, including the outer surfaces 111, 112 and the spacing members 13 advantageously has a thickness falling in the range between 2 mm and 50 mm, advantageously between 4 mm and 50 mm.

The thickness of the (dry) membrane layers 12, 13 (as coated on the outer surfaces 111, 112) is advantageously smaller than or equal to 500 µm, advantageously smaller than or equal to 400 µm, advantageously smaller than or equal to 300 µm, advantageously smaller than or equal to 250 µm, advantageously smaller than or equal to 200 µm. Such thickness is advantageously larger than or equal to 25 µm, advantageously larger than or equal to 30 µm, advantageously larger than or equal to 40 µm, advantageously larger than or equal to 50 µm.

Advantageously, the engagement heads 122, 622 and other undercut-type shapes 521 of the protuberances have a cross sectional linear size larger than the (smallest) size of the through-openings 115, advantageously at least 5% larger, advantageously at least 10% larger, advantageously at least 15% larger, advantageously at least 30% larger. The engagement heads 122, 622 advantageously have a height of at least 50 µm (measured in a direction normal to the outer surface, from its back side). In the case of FIG. 6, it will be convenient to note that the height is calculated from the back of outer sheet 618. The height advantageously falls in the range between 50 µm and 250 µm.

Figure 7:
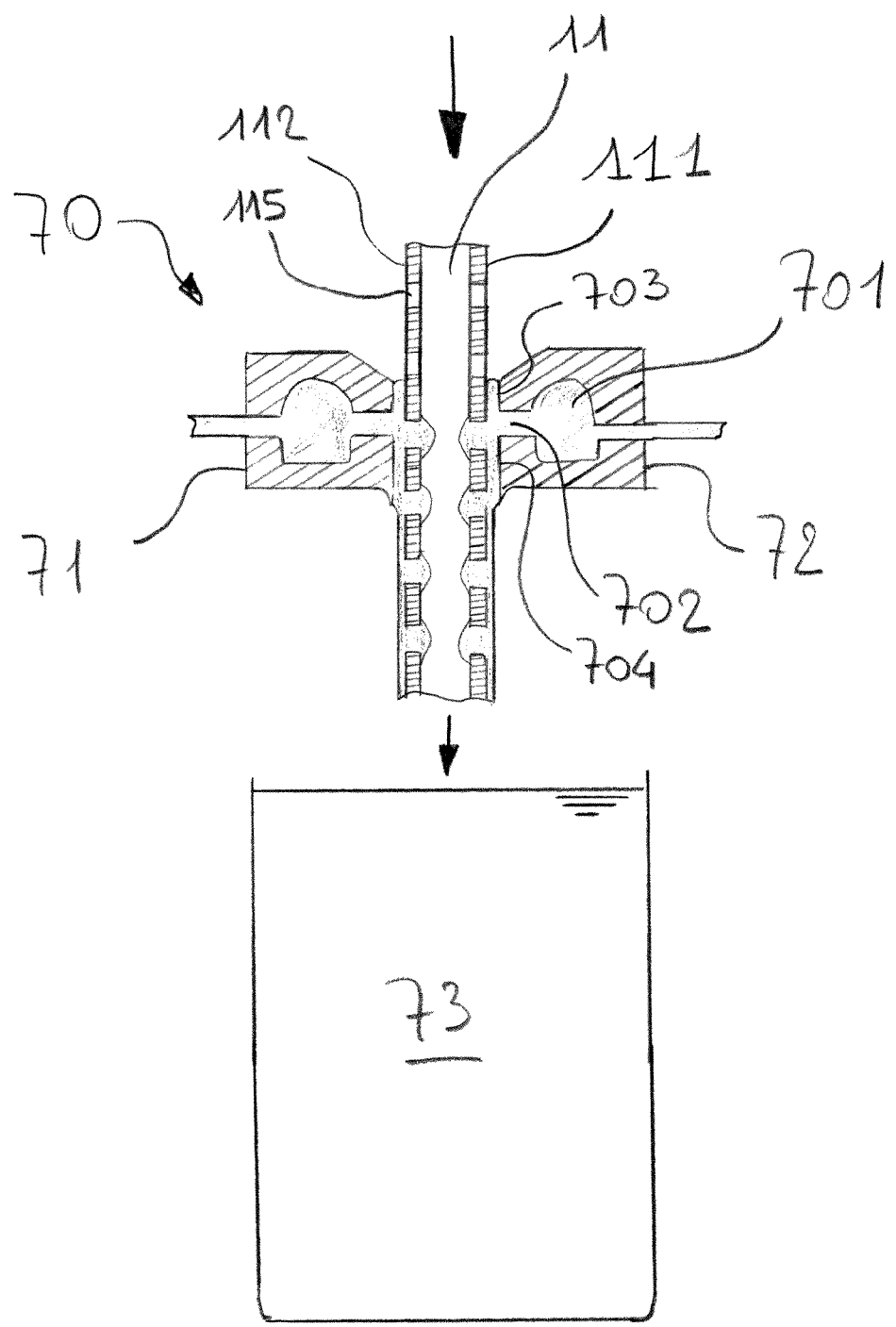
FIG. 7 represents a possible setup for producing filtration elements according to the invention.

The membrane layers 12, 13 can be applied and formed directly onto and into the support structure 11 with the aid of a duplex type coating system as shown in FIG. 7. In this system, the support structures 11 are successively and advantageously vertically fed through the duplex type coating system 70, as indicated by the arrow. The duplex type coating system 70 comprises two coating apparatuses 71 and 72 arranged such that they face each other. Each coating apparatus 71, 72 is of the type used for slot coating and comprises a distribution chamber 701 into which membrane dope is fed by a metering pump (not shown). A slot 702 extends from the distribution chamber to an outlet. The outlets of the coating apparatuses 71 and 72 are arranged to face each other and are spaced apart such that, when the support structure is fed in between, each outlet faces a support outer surface 111, 112. Substantially flat lips 703 and 704 extend at the upstream and downstream sides of the slot outlet, respectively.

Premetered and substantially identical quantities of a membrane forming dope (liquid) are fed by the slots 701 of coating apparatuses 71 and 72 to the support outer surfaces 111 and 112, while the support structure 11 is transported substantially vertically between the coating apparatuses 71, 72. Membrane forming dope is applied on both support outer surface layers and thereby penetrates the through-openings 115. By careful adjustment of the dope viscosity and the dope feed rate and by correct selection of the size and incidence of the through-openings 115, one can obtain that the dope forms mushroom-like plugs extending at the back sides of the outer surfaces, through the openings 115, without however clogging the channels 114.

It is advantageous to use a high viscosity dope in methods according to the present invention. Such a dope advantageously has a viscosity of at least 50 Pa·s, advantageously at least 100 Pa·s at 75° C. Viscosity can be measured with a HAAKE MARS rotational rheometer (Thermo Electron, Germany) using two titanium discs of 35 mm diameter. In addition to enabling coating of the through-openings and the formation of undercuts/engagement heads, such a high-viscosity dope also allows to obtain membranes with high cohesive strength, and hence high-resistant membrane layers. This is not possible with low-viscosity dopes as they are generally used in the prior art.

A high viscosity dope as indicated above hence enables to obtain membrane layers having a total porosity smaller than or equal to about 80% and advantageously falling in the range between about 50% and about 80%. The total porosity is calculated as (1 minus the relative density of the membrane material) multiplied by 100%.

The coated/impregnated support structure is then subjected to one or more membrane forming steps as known in the art, allowing the dope to form a solid membrane with a broad range of pore sizes and pore structures. This is also referred to as membrane coagulation. Advantageous dope forming techniques include liquid induced phase separation (LIPS), vapour induced phase separation (VIPS) and possibly also thermally induced phase separation (TIPS). All these processes are also referred to as phase inversion. That is, the membrane forming dope is composed of a solution of a membrane polymer. The dope is subsequently brought in contact with a fluid which is no solvent for the membrane polymer in order to induce demixing of the polymer solution. The polymer precipitates, hence forming the membrane.

Phase inversion can be obtained by immersing the coated support structures 11, as they exit the duplex coating system 70, in a liquid bath 73 containing the non-solvent. In addition, or alternatively, a concentrated vapour of a non-solvent, or of a liquid comprising the non-solvent can be maintained just below the duplex coating system 70. Such a concentrated vapour may help in forming the desired surface pores at the outer surfaces of the membrane layers.

It will be advantageous to bring also the back sides of the membrane, i.e. the protuberances 122, 521 and 622 in FIGS. 2, 5, 6 respectively, in contact with the liquid bath 73 containing the non-solvent and/or with the concentrated vapour of non-solvent in order to obtain a so-called symmetrical membrane layer 12, 52, 62. This may be obtained by ensuring that the channels 114 are free to allow the liquid of bath 73 and/or the concentrated vapour entering into them.

Figure 11:
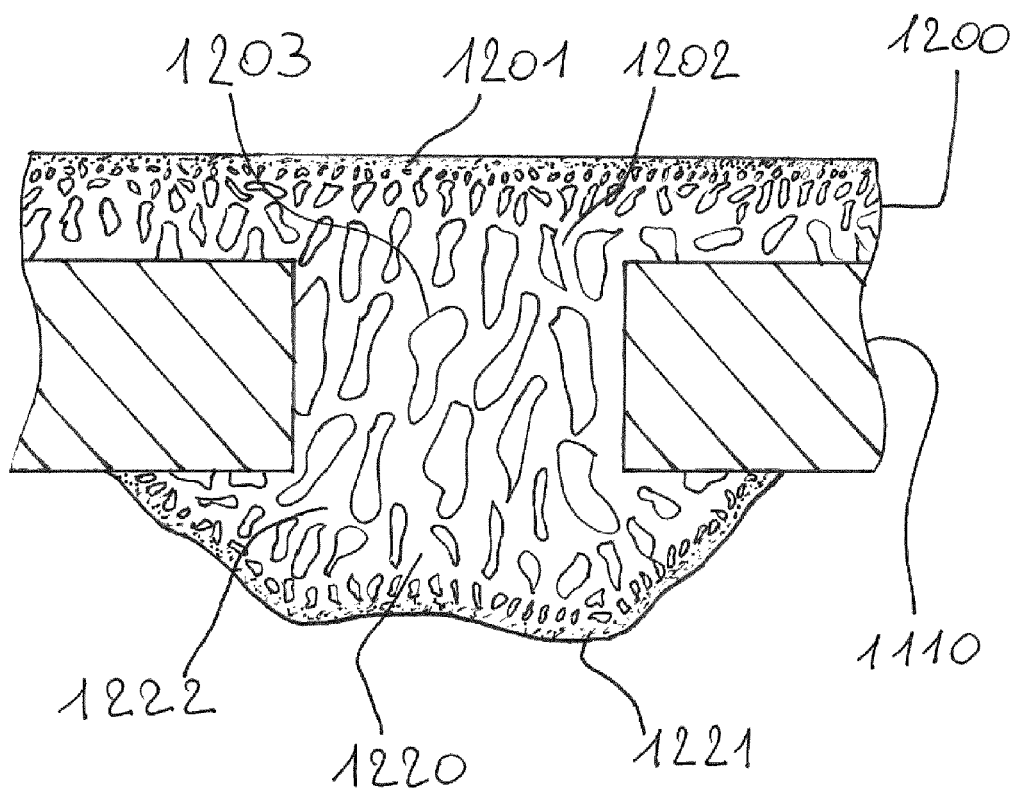
FIG. 11 is an enlarged cross section of a support and a membrane layer with engagement head according to an aspect of the invention, in which the pores of the membrane layer are schematically represented.

A symmetrical membrane layer refers to a membrane layer having a symmetrical pore size distribution across the membrane. That is, the pores at the outward surface sides of the membrane layer are smaller than the pores in the centre or core of the membrane layer. FIG. 11 shows a symmetrical pore size distribution within the membrane layer 1200, which is formed, according to the invention, on a sheet 1110. In such a symmetrical pore size distribution, an outer region 1221 of the engagement head 1220 at the back side of the sheet 1110 features pores similar (of size and shape) to the pores at an outer region 1201 of the membrane layer 1200. The pores 1203 in the core 1202 of the membrane layer (and hence also in the core 1222 of the protuberance/engagement head 1220) are at least one order of magnitude larger. The outward regions 1201 and 1221 with smaller pore size are referred to as the skins of the membrane layer. It is the pore size in skin layer 1201, i.e. the outer surface layer facing away from the filtration element, which determines the filtration characteristics.

The advantage of providing a skin 1221 at the back side of the membrane layer, i.e. facing toward the drainage compartment, is that skin layer 1221 accounts for a pressure drop during backwashing (i.e. flushing the filtration element from the inside channels 114 toward the outside), thus reducing the pressure which would otherwise be exerted on the outer skin region 1201. In fact, the large inner pores 1203 account for an insignificant pressure drop (this is beneficial for the permeability of the membrane) and without the 'inner' skin 1221, almost the entire pressure drop would fall on the 'outer' skin 1201 during backwashing, which would tear it from the membrane core 1202 and irreparably damage the membrane.

Thus, during normal filtration operation (from outside to the inside), the main pressure drop falls across the outer skin region 1201, hence pushing it inwards toward the support 1110, which the membrane can easily withstand. During backwashing, the main pressure drop falls across the inner skin region 1221, pushing it towards the core 1202. This is not problematic, since the head 1220 provides for sufficient engagement with the support 1110 to withstand such load. As a result, the integrity of the membrane is preserved under all circumstances and furthermore even higher backwash pressures can be used.

Since the support structures 11 of filter elements 10 according to the invention are generally rigid, a semi-continuous process is proposed, wherein individual support structures 11 are transported consecutively through the duplex coating system 70 and into bath 73, such as by attaching the support structures 11 to a conveyor chain. The duplex coating system 70 can then be configured for metering membrane dope only at the occurrence of a support structure 11 passing through.

A washing step may be provided after the membrane forming or coagulation step in order to remove any residual substances from the membrane layers 12, 13. Finally, the membranes can be left to dry in a drying step.

Post processing steps may include sealing of the membrane layers at the edges (e.g. by ultrasonic welding) and sealing or framing the support structure, thereby making a cartridge.

An alternative to duplex coating is to coat the two support structure surfaces consecutively by known techniques. After membrane formation on one side, the support structure may be treated on the reverse side.

Another alternative is to coat the support structures on one side only. To this end, a single-side coating system can be employed, with only one of coating apparatuses (dies) 71 or 72 provided. In such case, during coating, it may be advantageous arranging the support structure horizontally, instead of vertically as depicted in FIG. 7. The coating apparatus 71, 72 would then have to be positioned vertically instead of horizontally as depicted in FIG. 7.

Single-side coating allows for obtaining support structures coated with a membrane layer on one side (one outer surface layer) only. Two support structures may then be arranged with their non-coated outer surfaces against each other to form a planar filter element with membrane layers at opposite outer faces.

As an alternative to coating with coating apparatus 71 and/or 72 (duplex or single-side), the membrane solution may be coated with a doctor blade.

A doctor blade may additionally be provided downstream of coating apparatus 71 and/or 72 in order to scrape off excess membrane solution and smoothen the coating surface. By so doing, an occurrence of so-called 'valleys' in the membrane surface at the location of the through-openings may be decreased or even prevented.

It follows that the direct formation of the membrane layers on the support structure allows for a simpler production method with regard to the prior art. In the prior art, the membrane layer is pre-made as a possibly reinforced full-functioning membrane, and is placed on the support afterwards and sealed along the edges. A felt-like gauze layer is usually placed in between the pre-made membrane and the support. The correct application and disposition of the membrane layers in the prior art cartridges can be a time-consuming and difficult task, which is completely avoided within the present invention. Therefore, filter elements of the present invention can be more economical to produce.

Furthermore, with the present invention, membrane layers 12, 13 having comparable thickness as with the above described prior art membranes can be formed on the support structures.

The membrane layers preferably comprise a possibly hydrophilic filler material and a possibly organic binder material. The filler material may be organic and is advantageously selected from the group consisting of hydroxypropylcellulose, carboxymethylcellulose, polyvinyl pyrrolidone, cross-linked polyvinyl pyrrolidone, polyvinyl alcohol, polyvinyl acetate, polyethylene oxide. It may be inorganic, such as $TiO_2$, $HfO_2$, $Al_2O_3$, $ZrO_2$, $Zr_3(PO_4)_4$, $Y_2O_3$, $SiO_2$, perovskite oxide powder materials, and silicon carbides. Combinations of the above organic and inorganic materials can be used as well as filler material. The organic binder material is advantageously selected from the group consisting of polyvinyl chloride, chlorinated polyvinyl chloride, polysulfone, polyethersulfone, polyphenylene sulphide, polyurethane, polyvinylidene fluoride, polyimid, polyacrylonitrile, cellulose acetate, cellulose triacetate and their grafted variants.

The membrane dope may contain any type of polymer binder (such as the organic binders described hereinabove), an aprotic solvent, such as dimethylformamide (DMF), dimethylsulfoxide (DMSO), dimethylacetate (DMAc), N-methyl-2-pyrrolidone (NMP), or N-ethyl-2-pyrrolidone (NEP), and a filler material (such as the organic fillers described hereinabove). The non-solvent used for phase inversion may be liquid water, or mixtures of water with the aprotic solvent.

Even though filtration elements with membrane layers on both support structure outer surfaces have been described, it will be clear that filter elements where a membrane layer is only provided on one side of a support structure 11 can be produced as well. In that case, the non-coated outer surface does not need to be provided with through-openings 115.

Filter elements according to the invention can be used in applications such as microfiltration, ultrafiltration, nanofiltration, reverse osmosis, forward osmosis, pressure retarded osmosis, membrane bioreactors, pervaporation, membrane distillation, supported liquid membranes, pertraction, membrane absorbers, enzyme reactors, and other membrane contractors.

EXAMPLES

Example 1

Figure 8:
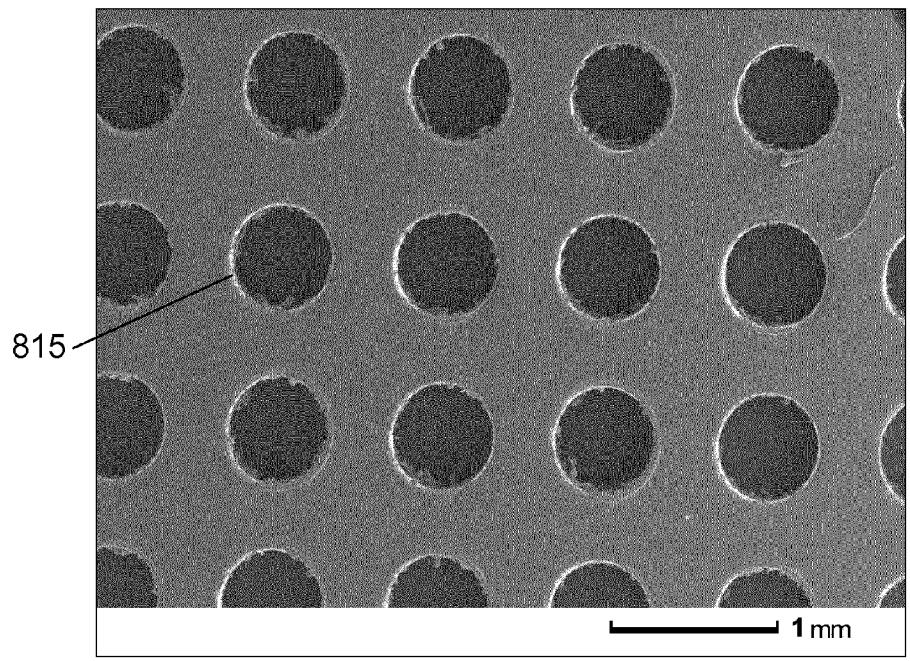
FIG. 8 is a scanning electron microscope (SEM) photograph of a perforated PET foil.

In order to test the feasibility of filter elements according to the invention, a PET foil of 250 μm thickness was perforated with holes of 0.55 mm diameter to obtain an open area (porosity) of 30%. A SEM photograph of the obtained foil is shown in FIG. 8 with through-openings represented at 815. Such a foil can be laminated or secured otherwise to form support structures according to the invention.

Example 2

A foil of the same type was perforated with holes of 1.5 mm diameter to obtain an open area of 50%.

For the sake of experiment, in order to test membrane adhesion, both the foils of examples 1 and 2 were not laminated to form a support structure as described above, but were coated on one side with a membrane dope in order to form a membrane layer of about 100 μm (dry) thickness on top. The composition of the membrane dope was 20% by weight polyethersulfone (PES), 10% by weight polyvinylpyrrolidone (PVP) type K90, 61% by weight NEP and 9% by weight glycerol. The membrane dope had a viscosity of 150 Pas at 20° C. The membrane dope was applied on the edge-supported foil by a doctor blade leaving a wet coating layer of about 150 μm thickness. During coating, the dope penetrated the perforations to form mushroom-shaped protuberances through the openings and at the back side of the foil.

The coated foil was immersed in a bath composed of 65% by weight water and 35% by weight NEP in order to coagulate the dope and form ultrafiltration surface pores (size smaller than 0.1 μm). Thereafter, the coated foil was washed with water at 50° C. followed by a treatment in a 4000 ppm NaOCl solution with pH of 7.5 during half an hour, followed again by washing with 50° C. water. Subsequently, the coated foils were immersed in a 10% by weight glycerol solution and left overnight. The latter step prevents pore collapse during drying. The coated foils were then left to dry at ambient conditions.

It will be convenient to note that for a microfiltration membrane, larger surface pores are required (size between 0.1 and 0.5 μm), which can e.g. be obtained with a coagulation bath comprising 35% by weight water and 65% by weight NEP and further following the above described treatment. The overnight glycerol treatment described above is not necessary, since pore collapse does not take place with such larger pores.

Figure 9:
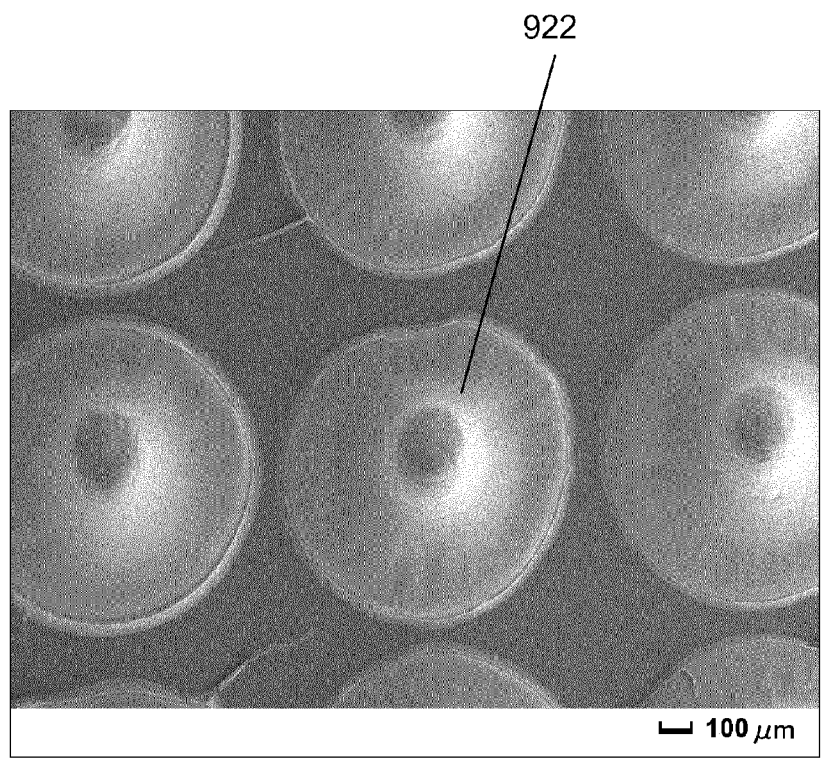
FIG. 9 is a SEM photograph of the back side of FIG. 8's foil after coating the front side with a membrane material.
Figure 10:
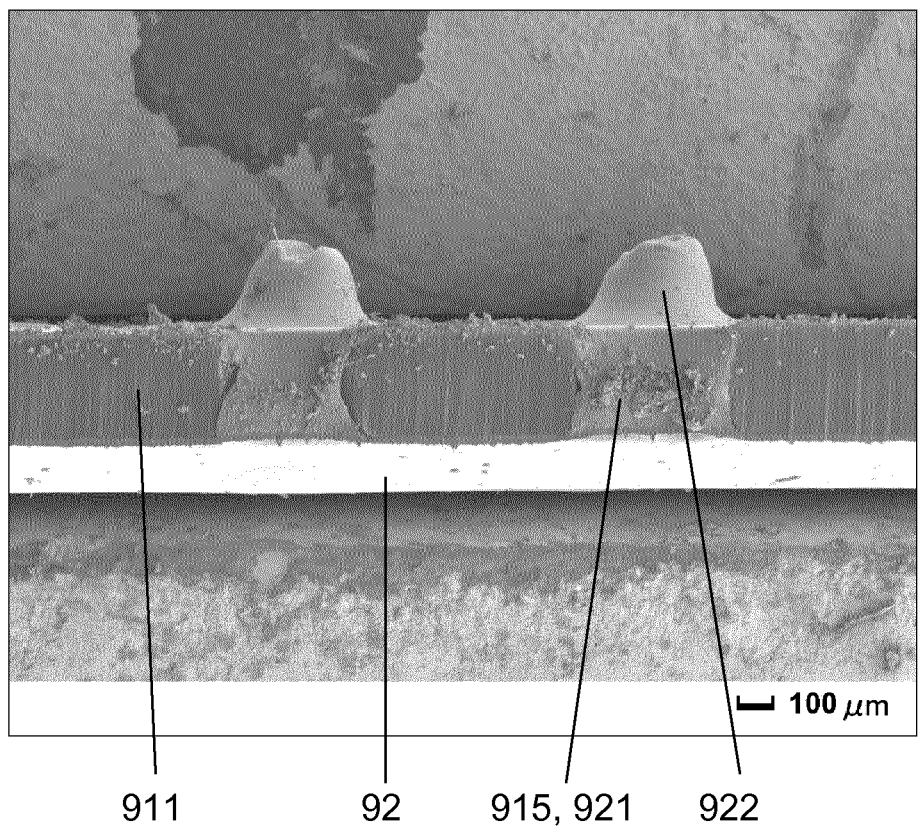
FIG. 10 is a SEM photograph of a cross section of FIG. 9's coated foil.

The obtained dry membrane thickness on top of the foils was about 100 μm. FIGS. 9 and 10 show SEM photographs of respectively the back side and of a cross section of the coated foil of example 1, both showing the engagement heads 922. FIG. 10 furthermore shows the support foil 911, the membrane layer 92 and the through-openings 915 filled with stems 921 of membrane material between the membrane layer 92 and the engagement heads 922.

Of each foil (example 1 and 2), three samples having a circular section of 34 mm diameter were taken and consecutively secured between two flanges in order to test membrane anchorage. A liquid having a viscosity 50 times higher than water (Baysilone Fluid M50, Bayer) was used to build up a pressure at the back side of the foil (at the side of the engagement heads), in order to simulate a backwash cycle. The pressure was increased to see when the membrane layer would detach from the foils. Table 1 shows test results for both examples. The membrane coated on example 1's foil can withstand back-pressures in excess of 5 bar, whereas the membrane coated on example 2's foil detaches at an average pressure of 1.4 bar.

TABLE 1

Measured membrane detachment pressures for perforated PET foil (250 μm thickness, 550 μm (example 1) and 1.5 mm (example 2) diameter perforations) coated with a PES/PVP membrane (100 μm)

| Sample no. | Membrane detachment pressure (bar) | |
|---|---|---|
| | Foil example 1 | Foil example 2 |
| 1 | >5 | 1.7 |
| 2 | >5 | 1.2 |
| 3 | >5 | 1.5 |

The invention claimed is:

1. A planar filtration element, comprising a rigid planar support structure and at least one filtration layer made of a membrane material, wherein the support structure comprises first and second opposite outer surface layers spaced apart and secured to each other at a multitude of points distributed throughout the support structure by spacing members extending between the first and second opposite outer surface layers, thus defining a drainage compartment between said first and second opposite outer surface layers, the drainage compartment is configured to drain filtrate, wherein at least one of said first and second outer surface layers comprises through-openings in fluid connection with the drainage compartment, wherein the through-openings are distributed throughout the at least one of the first and second opposite outer surface layers and are free of internal connections between one another within the at least one of the first and second opposite outer surface layers, wherein said first and second opposite outer surface layers have a thickness of at least 200 μm, wherein said at least one of the first and second opposite outer surface layers, except for the through-openings, is formed of a material extending continuously throughout the at least one of the first and second opposite outer surface layers, and wherein the at least one filtration layer covers the at least one of the first and second opposite outer surface layers including the through-openings, wherein the membrane material of the at least one filtration layer penetrates the through-openings, thus forming protuberances towards the drainage compartment, the protuberances having sizes larger than sizes of the through-openings, thus forming undercuts, the protuberances forming anchors for anchoring the at least one filtration layer to the support structure.

2. The filtration element of claim 1, wherein both the first and the second opposite outer surface layers comprise through-openings and both the first and the second opposite outer surface layers are covered with the filtration layers with the membrane material penetrating the through-openings thus forming the protuberances with undercut-type anchors.

3. The filtration element of claim 1, wherein the at least one of the first and second opposite outer surface layers and the at least one filtration layer exhibit a substantially flat interface extending between the through-openings.

4. The filtration element of claim 1, wherein the support structure has a flexural modulus of at least 150 MPa.

5. The filtration element of claim 1, wherein the through-openings are perforations.

6. The filtration element of claim 1, wherein the area of the through-openings per unit total surface area of the at least one of the first and second opposite outer surface layers falls in the range between 2% and 70%.

7. The filtration element of claim 1, wherein the through-openings have a size between 0.1 mm and 2 mm.

8. The filtration element of claim 1, wherein the at least one outer surface layer is formed of a superposition of an outer foil and an inner layer, wherein the outer foil is bonded to the inner layer and the outer foil and the inner layer comprise corresponding through-openings, the through-openings of the outer foil being smaller than corresponding through-openings of the inner layer, and wherein the protuberances are at least anchored to the outer foil.

9. The filtration element of claim 1, wherein the drainage compartment comprises liquid passageways at least partially void of membrane material.

10. The filtration element of claim 1, wherein at least one of the first and second opposite outer surface layer is void of through-openings along a peripheral border, and wherein the at least one filtration layer is sealed to the corresponding outer surface layer at said border.

11. The filtration element of claim 1, wherein the at least one filtration layer has a thickness falling in the range between 25 µm and 500 µm.

12. The filtration element of claim 1, wherein the support structure has a thickness falling in the range between 2 mm and 50 mm.

13. The filtration element of claim 1, wherein a size of the through-openings, an area of the through-openings per unit area of at least one of the first and second opposite outer surface layer, the membrane material, and a size of the protuberances are selected to obtain an anchorage between at least one of the first and second opposite outer surface layers and the at least one filtration layer resisting a back pressure of at least 1.4 bar.

14. A filtration device comprising a plurality of vertically arranged filtration elements according to claim 1.

15. A method of producing a planar filtration element, comprising:

providing a rigid planar support structure comprising first and second opposite outer surface layers formed of a material extending continuously throughout the first and second opposite outer surface layers, the first and second opposite outer surface layers being spaced apart and secured to each other at a multitude of points distributed throughout the support structure by spacing members to define a drainage compartment interposed between the first and second opposite outer surface layers, providing at least one of said first and second opposite outer surface layers at a multitude of points distributed throughout the layer with through-openings in fluid connection with the drainage compartment and without internal connections between one another within the first and second opposite outer surface layers, wherein the first and second opposite outer surface layers have a thickness of at least 200 µm, coating said at least one of the first and second opposite outer surface layers with a membrane forming liquid solution to obtain a coated support structure and such that the solution penetrates the through-openings, and applying at least one membrane forming step to the coated support structure to obtain, from the coated solution, a filtration layer having a membrane material, the filtration layer covering the at least one of the first and second opposite outer surface layers, and the membrane material penetrates the through openings forming protuberances, the protuberances projecting from the filtration layer through the through-openings and having sizes larger than sizes of the through-openings thus forming undercut-type anchors for anchoring the filtration layer to the support structure.

16. A method of claim 15, wherein the protuberances extend beyond the through-openings towards the drainage compartment.

17. A method of claim 15, wherein the through-openings are selected such that their size falls in the range between 0.1 mm and 2 mm and such that the area of the through-openings per unit total surface area of at least one of the first and second opposite outer surface layers falls in the range between 2% and 70%.

* * * * *